3,266,929
GOLD PLATING BY IMMERSION
Edward H. Lareau, Temple, Pa., and Charles R. Shipley, Jr., Newton, Mass., assignors to Shipley Company, Inc., Wellesley, Mass., a corporation of Massachusetts
No Drawing. Filed Dec. 17, 1962, Ser. No. 244,949
12 Claims. (Cl. 117—130)

This invention relates to immersion deposition of gold, that is, the deposition of gold over a metal a metal surface by displacement and in the absence of an external current, and to plating solutions therefor.

Immersion gold solutions have been heretofore known and have been used for plating jewelry and for plating electronic components to provide corrosion resistance. These prior solutions have been characterized by a relatively low degree of corrosion resistance, a short useful life, and by a high degree of toxicity due to the large excess of cyanide heretofore thought necessary for stability. A typical example of prior solutions as given in the Metal Finishing Guidebook Directory, 30th edition, 1962, Metals and Plastics Publications, Inc., provides a cyanide content in a molar ratio of CN:Au of about 49:1.

It is the principle object of the present invention to provide improved solutions for the immersion deposition of gold. Further objects include the provision of improved corrosion resistance, reduced toxicity, and relatively long utility in use.

In accordance with this invention the above objects are achieved with an aqeuous solution comprising gold ions in amount sufficient to provide a useful deposit, for example from about .005 molar (M) to about .09 M and more preferably from about .005 M to about .025 M; cyanide in a molar ratio to gold between about 1.9 to 1 and 1 to 1 and more preferably between about 1.6 to 1 and 1.2 to 1; and sufficient ammonium and sulfite ions to render the gold stable in solution during storage and use; the solution having a pH between about 7.0 and 10.5. While the amounts of ammonium and sulfite ions can be varied considerably, ammonium ion concentrations between about 0.3 M and saturation and sulfite ion concentrations between about .05 M and saturation are preferred. More preferably they are between about .776 M to 6.2 M and 142 M to 1.133 M, respectively. It is also preferred to incorporate carbonate ions as a buffer and an organic complexing agent selected from the group consisting of lower acyclic carboxylic acids, lower acyclic hydroxy-carboxylic acids, lower acylic polyols, and aminoacetic acid. Neither of these latter two ingredients is essential, but both are preferred; the carbonate between about one-fourth to about twice the preferred concentration shown in the example below and the organic complexing agent between about one-half and four times the concentration therein shown.

The preferred example according to the present invention is the solution resulting from admixture of the following ingredients:

*Example*

| | Molar |
|---|---|
| AuCN | .0068 |
| KAu(CN)$_2$ | .00423 |
| NH$_4$OH | 1.554 |
| NaHSO$_3$ | .504 |
| Na$_2$SO$_3$ | .0623 |
| Citric acid | .208 |
| NaHCO$_3$ | .783 |

H$_2$O, distilled, to make 1 liter.

In the above example, the gold is added in the form of the two cyanide salts in order to obtain directly the preferred ratio of cyanide to gold. Within the mol ratio limits stated herein, the cyanide exists in the solution in a combined state resulting in a less hazardous formulation. The desired ratio can also be obtained by using AuCN together with sufficient NaCN to provide the desired ratio. The desired pH is preferably obtained directly by the proper addition of ingredients but can be adjusted by increasing or decerasing the amount of ammonium hydroxide. Both carbonates and sulfite ions will be in equilibrium, at the desired pH, with some bicarbonate or bisulfite, respectively, and the term sulfite and carbonate as used herein and in the claims is intended to include such equilibrium salts. And while all of the cations other than gold in the solution can comprise ammonium if desired, or ammonium and other alkali metal, substantial amounts of sodium ion are preferred. Other non-deleterious metal ions such as nickel can be incorporated if desired.

The foregoing bath is useful to form deposits of gold over copper and its alloys; nickel; cobalt; silver; molybdenum; and iron-base alloys of nickel and cobalt such as those sold under the trademark Kovar. At present, its deposition over copper and nickel are most important. The solution may be used in any temperature from about 100° F. to boiling, but is preferably used at 160° F. to 175° F. The solution volume-to-surface area to be plated ratio is preferably about one gallon per square foot and the plating time preferred is thirty minutes to provide a gold coating of the order of 5 to 8 millionths of an inch in thickness. Lesser volume to area ratios can be employed with increased treating time, for example from thirty to forty-five minutes.

The surface to be plated should be precleaned by known techniques. One recommended procedure for copper is as follows:

(1) Clean with a hot alkaline cleaner, 3 to 5 minutes at 180 to 200° F., rinse, (2) Treat with concentrated sulphuric acid diluted with 9 volumes of water, rinse, (3) Treat with a chemical polish, rinse, (4) Treat with 10% citric acid for from 1 to 120 minutes at room temperature; and rinse.

The citric acid disclosed in the preferred formulation, of example above and which exists in the bath as a citrate salt, is believed to act as a coordinating or complexing agent not only for the gold in solution, but also for the metal ions entering the solution by displacement from the surface under treatment. For this purpose, organic compounds selected from the class consisting of lower acyclic carboxylic acids, lower acyclic hydroxy-carboxylic acids, aminoacetic acid and lower acyclic polyols can be used, for example: formic acid, acetic acid, propionic acid, butyric acid, tartaric acid, malic acid, pimalic acid, hydroxyacetic acid, gluconic acid, fumaric acid, aminoacetic acid, glycerine, manitol or sorbitol. Any of these materials or mixtures thereof can be substituted for the citric acid in the example, preferably in approximately similar amounts. The organic compound or mixture can be used from 0 to saturation in the bath but is more preferable within the limits of one-half to four times the concentration shown in example.

Where deposition is to be made over metal alloys containing iron, such as Kovar, it is preferred to include in the bath a chelating agent for the iron ions such as ethanol diglycine (EDG), diethanol glycine (DEG), or salts thereof. About 5 to 50 ml. chelating agent per liter of solution can be used, with about 10 ml. being preferred.

While the pH of the solutions of this invention may be from 7.0 to 10.5 more preferred pH's for particular metals are as follows.

| | |
|---|---|
| Copper | 8.5 to 10 |
| Nickel | 7.5 to 10 |
| Kovar | 7.5 to 8 |

It has been found that the solutions of the present invention provide gold deposits which are substantially nonporous, substantially pure, and which have excellent corrosion resistance. Gold coatings from about five to eight millionths of an inch in thickness provide good resistance to equal volumes of concentrated $HNO_3$ and water for at least twenty minutes. By the use of higher solution-volume to plating-area ratios, greater gold concentrations, and longer treating times, deposits of from thirty to forty millionths of an inch can be obtained. The solutions also deposit coatings with high corrosion resistance throughout the life of the bath, in distinction to prior art solutions which lose this property in a relatively short time. Deposits according to the present invention have been tested in a standard 5% salt spray atmosphere for more than forty-eight hours with no discernible chemical attack on the deposit or the substrate, and heating the deposit to a temperature of from 450° F. to 500° F. for periods of from thirty to sixty minutes resulted in no discoloration, indicative of an impurity-free deposit.

It should be understood that the foregoing description is for the purpose of illustration and that the invention includes all modifications falling within the scope of the appended claims.

We claim:

1. An aqueous solution for the plating of gold by chemical displacement, said solution comprising gold ions in amounts sufficient to provide a useful deposit, cyanide ions in an amount sufficient to provide a molar ratio of cyanide to gold between about 1.9 to 1 and 1 to 1, and ammonium and sulphite ions in amounts sufficient to render said gold stable in solution during storage and use, said solution having a pH between about 7.0 to 10.5

2. A solution according to claim 1, having gold ions between about .005 and .09 molar, ammonium ions between about 0.3 molar to saturation, and sulphite ions from about .05 molar to saturation.

3. A bath according to claim 2, further comprising carbonate ions as buffers.

4. A bath according to claim 1, having gold ions between about .005 molar and about .025 molar, cyanide ions sufficient to provide a ratio between about 1.6 to 1 and about 1.2 to 1, ammonium ions between about .776 molar and 6.22 molar, and sulphite ions between about .142 molar and 1.133 molar.

5. A solution according to claim 1, further comprising an organic complexing agent selected from the group consisting of lower acyclic carboxylic acids, lower acyclic hydroxy-carboxylic acids, aminoacetic acid, and lower acyclic polyols.

6. A bath according to claim 1, further comprising a chelating agent for the ions of iron selected from the group consisting of ethanol diglycine, diethanol glycine, and salts thereof.

7. An aqueous solution for the plating of gold by chemical displacement, said solution having a pH between about 7.0 and 10.5 and comprising gold ions between about .005 and .09 molar; cyanide ions in a molar ratio to gold between about 1.9 to 1 and 1 to 1; ammonium ions at least about 0.3 molar; sulfite ions at least about .05 molar; the balance of the cations present being substantially alkali metal ions; and an organic complexing agent selected from the group consisting of lower acyclic carboxylic acids, lower acyclic hydroxy-carboxylic acids, aminoacetic acid, and lower acyclic polyols.

8. An aqueous solution according to claim 7, wherein substantial amounts of said alkali metal ions are sodium ions.

9. An aqueous solution for the plating of gold by chemical displacement, said solution comprising the following ingredients in about the following proportions:

| | Molar |
|---|---|
| AuCN | .0068 |
| KAu(CN)$_2$ | .00423 |
| NH$_4$OH | 1.554 |
| NaHSO$_3$ | .504 |
| Na$_2$SO$_3$ | .0623 |
| Citric acid | .208 |
| NaHCO$_3$ | .783 |

H$_2$O, distilled, to make 1 liter.

10. A method of plating gold over the surface of copper, nickel, cobalt, molybdenum and iron-base alloys of nickel and cobalt which comprises cleaning said surface and contacting the same for about thirty minutes with a bath according to claim 1 at a temperature between about 100° F. and boiling.

11. A method according to claim 10, wherein said surface is contacted by said bath at a temperature between about 160° F. and 175° F.

12. A method of plating gold over the surface of copper, nickel, cobalt, molybdenum and iron base alloys of nickel and cobalt which comprises cleaning said surface and contacting the same for about thirty minutes with a bath according to claim 7 at a temperature between about 100° F. and boiling.

References Cited by the Examiner

UNITED STATES PATENTS

| 2,501,737 | 3/1950 | Porter. |
| 3,032,436 | 5/1962 | Gostin et al. |
| 3,123,484 | 3/1964 | Pokras et al. |

FOREIGN PATENTS

| 872,785 | 7/1961 | Great Britain. |

OTHER REFERENCES

Frary: Transactions of the American Electrochemical Society, vol. 23, 1913, pp. 40, 41, 49, 50.

ALFRED L. LEAVITT, *Primary Examiner.*

RALPH S. KENDALL, *Examiner.*